(No Model.)
F. H. BROWN.
APPARATUS FOR DETECTING MINERAL ORES.
No. 274,882. Patented Mar. 27, 1883.
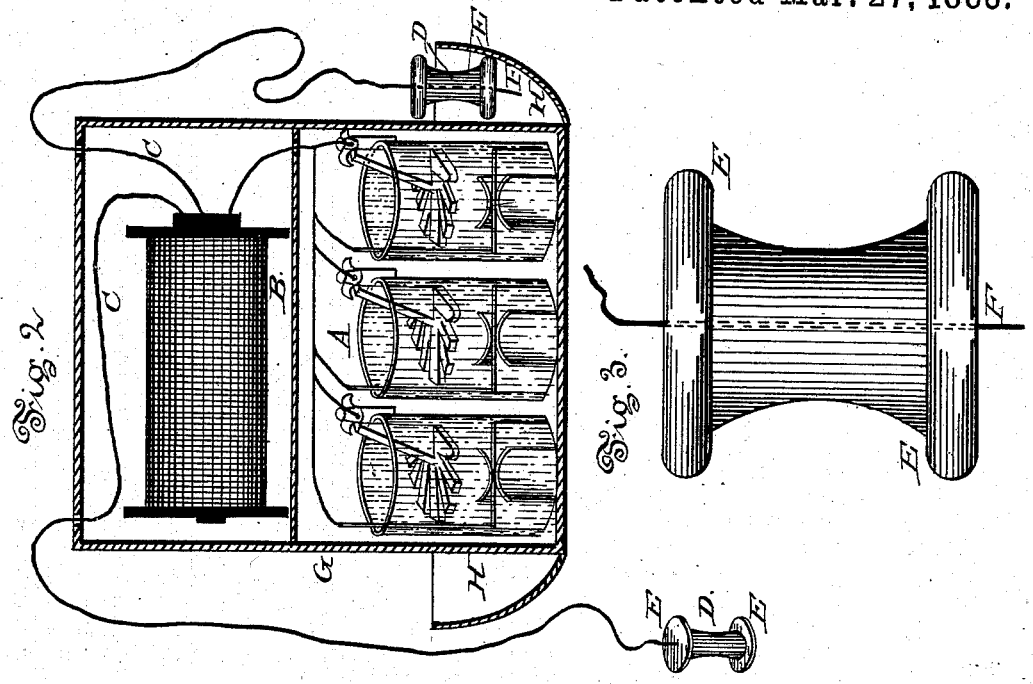
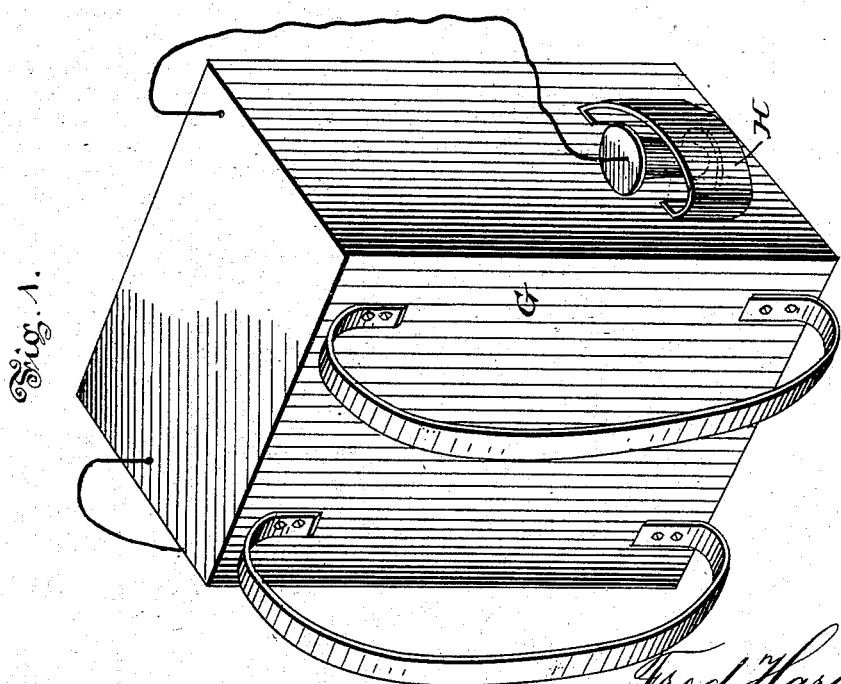
WITNESSES:
Fred G. Dieterich.
Fred Harvey Brown,
INVENTOR.
By Louis Bagger & Co.
ATTORNEYS.

UNITED STATES PATENT OFFICE.

FRED H. BROWN, OF BOULDER, COLORADO.

APPARATUS FOR DETECTING MINERAL ORES.

SPECIFICATION forming part of Letters Patent No. 274,882, dated March 27, 1883.

Application filed January 31, 1883. (No model.)

*To all whom it may concern:*

Be it known that I, FRED H. BROWN, of Boulder, in the county of Boulder and State of Colorado, have invented certain new and useful Improvements in Apparatus for Detecting and Locating Mineral Ores; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my device for detecting and locating mineral ores. Fig. 2 is a longitudinal sectional view of the same, and Fig. 3 is a detail view of the same.

Similar letters of reference indicate corresponding parts in all the figures.

My invention has relation to apparatus for detecting and locating mineral ore by electricity; and it consists in the improved construction and combination of parts of the same, as hereinafter more fully described and claimed.

In the accompanying drawings, the letter A represents a battery, and B an induction-coil of any desired construction. From the coil pass two insulated wires, C C, which may be of any desirable length, and which terminate in two handles, D, which are of glass or other non-conducting material, shaped like a dumb-bell, the front plates, E, guarding the hands against contact with the bare copper points F of the wires, which pass through the handles. By placing these points against a mineral, they will indicate the presence of metal by the electric spark passing from the points toward the mineral, instead of from one to another, and by having a sufficiently strong current the presence of metal may be determined in large bodies of mineral by holding one point against the rock and passing the other point over its surface, the wire point emitting sparks when finding a conductor—i. e., metallic ore.

For the purpose of conveniently transporting the device from place to place, the batteries and coil may be placed in a box or casing, G, provided with straps for conveniently carrying it, and having non-conducting pockets, H, on the sides, for the reception of the handles and points, so that a man may carry the apparatus on his shoulders in the manner of a knapsack, and have the handles and points convenient for immediate use.

Having thus described my invention, I claim and desire to secure by Letters Patent of the United States—

The apparatus for detecting and locating mineral ores, consisting of the battery A, induction-coil B, wires C, having bare copper points F, dumb-bell-shaped handles D, having guard-plates E, and casing G, having shoulder-straps and pockets H, substantially as and for the purpose shown and set forth.

In testimony that I claim the foregoing as my own I have hereunto affixed my signature in presence of two witnesses.

FRED HARVEY BROWN.

Witnesses:
 WARREN BROWN,
 SHEP. MADERA.